US012704480B2

(12) United States Patent
Van Den Bossche

(10) Patent No.: US 12,704,480 B2
(45) Date of Patent: Aug. 11, 2026

(54) SUPPORT BED FOR IMPACT MEASUREMENTS

(71) Applicant: GRINDOSONIC BV, Leuven (BE)

(72) Inventor: Alex Van Den Bossche, Neerijse (BE)

(73) Assignee: GRINDOSONIC BV, Leuven (BE)

( * ) Notice: Subject to any disclaimer, the term of this patent is extended or adjusted under 35 U.S.C. 154(b) by 302 days.

(21) Appl. No.: 18/701,038

(22) PCT Filed: Oct. 25, 2022

(86) PCT No.: PCT/EP2022/079767
§ 371 (c)(1),
(2) Date: Apr. 12, 2024

(87) PCT Pub. No.: WO2023/072925
PCT Pub. Date: May 4, 2023

(65) Prior Publication Data

US 2024/0345030 A1 Oct. 17, 2024

(30) Foreign Application Priority Data

Oct. 25, 2021 (EP) .................................... 21204598

(51) Int. Cl.
*G01N 29/04* (2006.01)

(52) U.S. Cl.
CPC ..... *G01N 29/045* (2013.01); *G01N 2291/023* (2013.01)

(58) Field of Classification Search
CPC ........... G01N 29/045; G01N 2291/023; G01N 2291/014; G01N 2291/2632; G01N 29/12;

(Continued)

(56) References Cited

U.S. PATENT DOCUMENTS 12,061,177 B2 * 8/2024 Van Den Bossche ....................... G01N 29/4436
2012/0085172 A1 4/2012 Wernitz

FOREIGN PATENT DOCUMENTS

WO 2019020825 A1 1/2019
WO 2020254698 A1 12/2020

OTHER PUBLICATIONS

European Search Report from corresponding EP Application No. 21204598.3, Apr. 8, 2022.

(Continued)

*Primary Examiner* — Xin Y Zhong
(74) *Attorney, Agent, or Firm* — Workman Nydegger

(57) ABSTRACT

An impact excitation measurement system includes a temperature controlled testing chamber, an impactor, a sensor system and a support system. The impactor is configured to, at any testing temperature within a testing temperature range of between 0° C. and 1600° C. The sensor system is configured to obtain a vibrational response of the test piece to the impact provided to the test piece by the impactor. The support system includes a bedding for supporting a solid test piece within the testing chamber. The bedding has an elasticity which is substantially larger than the elasticity of the test piece. The impactor is configured to provide the impact to the test piece at an impact height. The bedding is configured to support the test piece at a support height which differs from the impact height for at most 0.5 mm at any testing temperature within the testing temperature range.

13 Claims, 4 Drawing Sheets

(58) Field of Classification Search
CPC .. G01N 29/223; G01N 29/228; G01N 29/326; G01N 29/46
See application file for complete search history.

(56) References Cited

OTHER PUBLICATIONS

International Search Report from corresponding PCT Application No. PCT/EP2022/079767, Feb. 22, 2023.
Mandelshtam, et al., "Harmonic Inversion of Time Signals and its Applications", The Journal of Chemical Physics, vol. 107, No. 17, Nov. 1, 1997, pp. 6756-6769.
De Cicco et al., "Use of a Simple Non-Destructive Technique for Evaluation of the Elastic and Vibration Properties of Fiber-Reinforced and 3D Fiber-Metal Laminate Composites", Fibers, vol. 6, No. 14, Mar. 2, 2018, pp. 1-18.

* cited by examiner 310
305
303
306
301
307
310
311
304
314
312
302
101
107
315
312
317
313
318
319
316
or
380
pressure pulse

SUPPORT BED FOR IMPACT MEASUREMENTS

TECHNICAL FIELD

The present invention relates to a non-destructive method and system for performing measurements on a solid test piece using an impact excitation technique. The present invention is particularly useful for performing tests on the test piece at different temperatures. The measurements are useful for detecting defects and anomalies in solids, and characterizing the E-modulus, G-modulus, Poisson's constant and damping parameters. More in particular, the present invention relates to an improved support system for keeping the test piece in a correct position.

BACKGROUND

Testing of solids can be done in a number of ways. A first test usually consists of a visual inspection to see if a solid has the right size and shape, and to check for surface defects. However, in many cases the properties of the solid depend largely on internal structure, which can be invisible. For instance, the strength of metals and alloys depends largely on certain types and amount of bulk defects. These defects can be both small and large, and could occur because of natural causes, because of the manner of production, because of wear and tear, because of accidents, etc.

Independent of how the defects occur, it is in some cases important to know the state of a solid with respect to its defects. In order to analyse a solid for defects, one can use an invasive method or a non-invasive method on a test piece of the solid. A non-invasive method hereby allows analysis without destroying or altering the test piece. Hence, non-invasive methods are typically used for test pieces which still need to be used later, or which need to undergo further tests (which could themselves be invasive or non-invasive).

One type of non-invasive testing method for solids uses vibrations to analyse the test piece. Hereby the test piece is subjected to controlled vibrations which can propagate through the solid, hereby being transmitted, reflected or absorbed. The controlled vibrations may be induced with an impact excitation technique (IET), whereby the test piece is positioned in such a way that it can vibrate substantially unhindered upon being impacted. In impulse excitation techniques, the material properties of test piece are then determined by impacting the sample with a dedicated tool or projectile, and analysing the resulting vibrations as they are picked up with a vibration signal measurement sensor, such as a piezoelectric sensor, a microphone, a laser vibrometer or an accelerometer. Vibrations through solid are also referred to as sound or as sound waves and the measurements are also referred to as acoustic measurements. A vibration signal measurement sensor is therefor also termed "acoustic sensor" in the context of this application.

An apparatus for testing a solid using sound has been described in international application WO 2019/020825 A1. This document discloses an apparatus for analysing a mechanical vibratory response of a solid material sample, the apparatus comprising: an array of impactors arranged to impart an impact on respective well-defined points on the surface of said solid material sample; a sensor configured to capture said mechanical vibratory response as a time-varying signal, subsequent to an impact of said at least one impactor; and processing means configured to analyse said time-varying signal to determine the frequencies and decay constants of sinusoids making up said time-varying signal.

The invention also pertains to a corresponding method of characterizing a solid material sample.

The analysis of the response of the solid test piece to vibrational excitations typically involves the extraction of one or more, and preferably all, of the following parameters:

- Young's modulus (E), which is indicative of the test piece's tensile elasticity;
- the shear modulus (G), which is indicative of the test piece's response to shear stress;
- Poisson's ratio (v), which is indicative of the test piece's deformation in directions orthogonal to an applied uniaxial stress;
- Damping or attenuation of the signal caused by internal friction These properties typically depend on the frequency or frequency range of the vibrational excitation. Hereby, the test piece may have a number of resonance frequencies, which depend on the different vibrational modes of the test piece. Important modes are hereby the bending mode and the torsion mode. The parameter values at these resonance frequencies are important numbers for describing the state of the test piece.

In many applications, solid components, e.g. in machinery, are used at different temperatures. The operation temperature can hereby fluctuate quickly and/or over a wide temperature range. For instance, brake discs in vehicles can heat up considerably and fast during operation (from basically environmental temperature to more than 500° C. in a matter of seconds). Another example is injection nozzles of kerosene for the jets of an airplane, which could heat up to more than 1500° C. during operation. The high temperature range may considerably affect the material properties of the component, and in particular the elastic properties such as the abovementioned Young's modulus, shear modulus and Poisson's ratio. For instance, it can generally be expected that a solid becomes more flexible at higher temperature due to a weakening of the internal bonds on average, which basically means that one expects E and G to decrease gradually with increasing temperature.

At different temperatures, solid components may have different material properties. This can affect the component's functioning. It is important to find out at which temperatures or temperature ranges the component's normal or intended functioning is hindered. This can be due to bulk properties of the material, defects which can be induced by altering the temperature, defects which may become more important at higher temperature, variability of expansion different parts of the component, etc. Concrete examples of the temperature-dependence of the component's material properties are:

- general change of elasticity properties, which make the component less rigid, thereby hindering its proper functioning, for instance a brake disc may become too elastic at high temperature to allow proper braking,
- a phase transition at a certain temperature or within a certain temperature range could seriously change the component's material properties,
- a chemical reaction could equally alter the component's material properties,
- precipitations of a stoichiometric different phase, e.g. in an alloy, could be present in a material due to for instance a faulty production method, and lead to an internal material boundary between materials having different temperature-dependent expansion. Clearly this could lead to severe problems, laminates or other layered components, whereby the adhesion of one layer to the next could degrade at increased temperature.

In order to test for the proper functioning of solid components at different temperatures and/or throughout the full temperature range of intended operation, the material properties of a test piece need to be measured at different temperatures. Hereby, the test piece could for instance be the full component, part of the component, or a piece of the same material of the component. Testing is preferably done in a controlled environment allowing control over at least the temperature. At different temperatures, the material properties are then measured.

The inventors have found that measuring the material properties of a test piece over a wide temperature range, which could span from less than −50° C. to more than 2000° C., can be very difficult in practice. Creating a temperature controlled environment for such a temperature range typically requires an oven which may comprise a number of vibration-producing components. Clearly, the background vibrations created by the oven can interfere with the measurement process. These background vibrations typically worsen at higher temperatures. Furthermore, since one may expect some material properties (e.g. E and G) to decrease with increasing temperature, the signal will also decrease. Both effects will lead to a lower signal-to-noise (STN) ratio at high temperatures.

International application WO 2020/254698 A1 discloses a method for acoustically measuring material properties of a test piece at high temperatures, comprising the steps of: a. heating the test piece to within a testing temperature range; b. performing a background measurement within said testing temperature range by capturing a vibrational signal from the test piece within a calibration period, thereby obtaining a noise signal; c. performing an acoustic measurement on said test piece within said testing temperature range and within a testing period by: c1. imparting a vibrational excitation onto the test piece; c2. capturing a vibrational signal of the test piece within the testing period, thereby obtaining a vibrational response signal to said vibrational excitation, and d. obtaining the material properties of the test piece by analysing the vibrational response signal, thereby taking into account the noise signal. The document also discloses a system for acoustically measuring material properties of a test piece at high temperatures.

Although the above prior art document discloses a method and system for obtaining an acoustic response to an impact at different temperatures, the inventors have found that accuracy may still be improved, in particular for tests performed at different temperatures.

The present invention aims to solve the problem of a worsening STN ratio for acoustic measurements on test pieces at high temperatures and to obtain more precise damping measurement results at any temperature. Furthermore, the present invention presents a novel and inventive support system for supporting a test piece within a testing chamber, the support system being capable of supporting the test piece at different temperatures in a stable and error-reducing manner.

SUMMARY OF THE INVENTION

The present invention concerns an impact excitation measurement system comprising a temperature controlled testing chamber, an impactor, a sensor system and a support system. The system can be used to test the vibrational response of a test piece at various temperatures within a testing temperature range in order to obtain material properties of the test piece at different temperatures which can be important to check for material defects in the test piece or deviations of the test piece composition or structures from the expected or ideal behaviour. The impactor is thus configured to, at any testing temperature within a testing temperature range of between 0° C. and 1600° C., provide an impact from below to a test piece supported by the support system. The impactor preferably is a ballistic impactor, meaning that a velocity is provided to the impactor, preferably by an impactor actuator, after which the impactor moves under the force of gravity at least until it impacts on the test piece. By providing the impact from below, the impactor may fall downwards after the impact, ensuring that the impactor does not provide a second impact on the test piece. The sensor system is configured to obtain a vibrational response of the test piece to the impact provided to the test piece by the impactor. Preferably, the sensor system comprises one or more microphones, capable of registering the acoustic response of the test piece. Alternatively, or additionally, the sensor system may also comprise one or more coherent light sources, such as a laser, and one or more optical sensors which are configured to register light from the coherent light sources which is reflected from the test piece, thereby measuring the vibration response of the test piece.

The support system comprises a bedding for supporting a solid test piece within the testing chamber, said bedding comprising an elasticity which is substantially larger than the elasticity of the test piece, said bedding further comprising a through for allowing the impactor to provide an impact to the test piece from below. The term "elasticity" of a component refers to the manner in which the component stretches elastically under a stress, whereby a first component is called more elastic than a second component if the first component has a larger relative strain under the same stress than the second component. Hereby the elasticity can be expressed in terms of a ratio (E/o) of a relative strain parameter ($\varepsilon$) divided by a stress parameter ($\sigma$) for clastic deformations, preferably this ratio being Young's modulus (E). Preferably the elasticity of the support bedding is at least 5 times the elasticity of the material of the test piece, more preferably at least 10 times, still more preferably at least 50 times, yet more preferably at least 100 times, still more preferably at least 200 times, even more preferably at least 500 times, yet even more preferably at least 1000 times the elasticity of the material of the test piece. The system and method of the present invention relate to a method for obtaining properties of a test piece by measuring an acoustic response to an impact, and by analysing the acoustic response with respect to resonance frequencies, shifts in resonance frequencies, decay constants of the response at certain frequencies, etc.

The impactor in the system according to the invention is configured to provide the impact to the test piece at an impact height. The impact height is the intended height at which the impactor is to provide the impact onto the test piece. In case the impactor is a ballistic impactor, the impactor actuator is configured to provide a vertical velocity component to the impactor which is large enough for the impactor to reach the impact height, and preferably larger such that the impactor transfers an amount of impact energy to the test piece. Typically, an experimenter would like to control the impact energy as good as possible, as this corresponds to the energy transferred from the impactor to the test piece to cause vibrations. Preferably the amount of impact energy is small enough such that the impact does not plastically deforms the test piece. Furthermore, the amount of impact energy preferably essentially corresponds to the energy required to make the test piece vibrate with an amplitude corresponding to an optimal sensitivity of the sensor system.

In the invention, the impact height is at least partially dependent upon the testing temperature. Because the testing temperature may vary within a large temperature range, the impactor itself may have dimensions, in particular a height, which may vary for measurements at different temperatures. The impact height thus depends on the thermal linear expansion of the impactor, and more particularly on the thermal linear expansion of the height of the impactor. The impact height may also depend on other characteristics, which are temperature dependent. For instance, the impactor may be driven by an impactor actuator, which may at least partially be positioned inside the testing chamber and which may thus be at the testing temperature. If the impactor actuator has temperature dependent characteristics, it is likely that the energy provided to the impactor by the impactor actuator also will have a temperature dependence, which in turn may affect the impact height. Note again, that the impact height is the intended height at which the impactor is to provide the impact onto the test piece, and is controlled by the impactor and the test settings of the impactor actuator.

In the system of the invention, the bedding is configured to support the test piece at a support height. The support height refers to the actual height at which the test piece is supported, and in particular the height at the position of where the impact is provided to the test piece by the impactor. In many cases, the test piece has a beam shape, and is supported horizontally with a bottom face of the beam being positioned horizontally at the support height. In order to ensure accurate measurements, the support height differs from the impact height for at most 0.5 mm at any testing temperature within said testing temperature range. Preferably, the support height is essentially the same as the impact height at any testing temperature within said testing temperature range.

The inventors have found that when performing measurements at different temperatures spanning a large temperature interval, the accuracy of the measurements was highly temperature dependent. In these measurements, for each temperature the same process parameters were used, including the same settings for the actuation of the impactor. The inventors have surprisingly found that the main cause for the change in accuracy was due to thermal expansions which changed the position of the test piece with respect to the impactor, and more particularly with respect to the changed height of the test piece with respect to impactor: thermal expansion typically is very small, and cannot easily be seen with the naked eye. In fact, small height changes of the order of 1 mm are hardly visible at all, but may already lead to a substantial decrease of accuracy.

Hence, the inventors have found that the accuracy of the measurements which have been obtained with prior art support systems may be improved. Hereby, the inventors have noticed that accuracy may depend on the temperature and have found that thermal expansion of the support system plays a significant role in obtaining accurate measurements. This effect is particularly pronounced if the temperature interval over which the measurements are performed, is large. Indeed, the system requires a support system which is capable of supporting the test piece in such a way that its vibrational characteristics are unaffected by said support system. It is not trivial to find such a support system which is also capable of keeping the test piece at a support height which does not significantly change with respect to the impactor. The impactor is configured to provide an impact to the test piece at a certain height. Any change in the relative height between the impactor and the support system thus affects the capability of the system to perform accurate measurements.

Therefore, the support system of the system of the present invention comprises a support bedding preferably consisting of a thermally stable elastic material in the shape of a flat mat. The support bedding preferably comprises an open structure. Preferably the support bedding is composed of a nonwoven material. The support bedding comprises at least one through for allowing the impactor to provide an impact to the test piece from below.

The term "thermally stable material" refers to a material which has a very small thermal expansion over a large temperature interval. Preferably, the material comprises a linear expansion coefficient of at most $25.0\times10^{-6}$ $K^{-1}$, more preferably at most $15.0\times10^{-6}$ $K^{-1}$, yet more preferably at most $10.0\times10^{-6}$ $K^{-1}$, still more preferably at most $8.0\times10^{-6}$ $K^{-1}$, even more preferably at most $6.0\times10^{-6}$ $K^{-1}$, yet even more preferably at most $5.0\times10^{-6}$ $K^{-1}$, still even more preferably at most $4.0\times10^{-6}$ $K^{-1}$, most preferably at most $3.0\times10^{-6}$ $K^{-1}$. Preferably, the materials comprises such low thermal expansion over the full range of the temperature interval over which the measurements are performed.

The present invention also concerns a kit comprising:

- an impact excitation measurement system comprising a temperature controlled testing chamber, an impactor and a sensor system, wherein the impactor is configured to, at any testing temperature within a testing temperature range of between 0° C. and 1600° C., provide an impact from below to a test piece, wherein the sensor system is configured to obtain a vibrational response of the test piece to the impact provided to the test piece by the impactor, wherein the impactor is configured to provide an impact to a test piece at an impact height which impact height is at least partially dependent upon the testing temperature,
- a solid test piece, and
- a support system, comprising a bedding for supporting a solid test piece within the testing chamber, said bedding comprising an elasticity which is substantially larger than the elasticity of the test piece, said bedding further comprising a through for allowing the impactor to provide an impact to the test piece from below, the bedding comprising a support surface for supporting the test piece at a support height which differs from the impact height for at most 0.5 mm at any testing temperature within said testing temperature range.

The present invention also concerns a method for acoustically measuring material properties of a test piece, preferably at one or more temperatures within a temperature range of between 0° C. and 1600° C., comprising the steps of:

a. placing a test piece on the support system in a testing chamber of a system according to the present invention, and preferably heating the test piece to within a testing temperature range;
b. preferably performing a background measurement, preferably within said testing temperature range, by capturing a vibrational signal from the test piece within a calibration period, thereby obtaining a noise signal;
c. performing an acoustic measurement on said test piece, preferably within said testing temperature range, within a testing period by:

c1. imparting a vibrational excitation onto the test piece;

c2. capturing a vibrational signal of the test piece within the testing period, thereby obtaining a vibrational response signal to said vibrational excitation, and d. obtaining the material properties of the test piece by analysing the vibrational response signal, preferably thereby taking into account the noise signal.

SUMMARY OF THE FIGURES

FIGS. 1A and 1B illustrate a support bedding with and without a beam shaped test piece in accordance with the present invention, as well as nodes of vibrational modes of the test piece.

DETAILED DESCRIPTION OF THE INVENTION

Figure 1B:
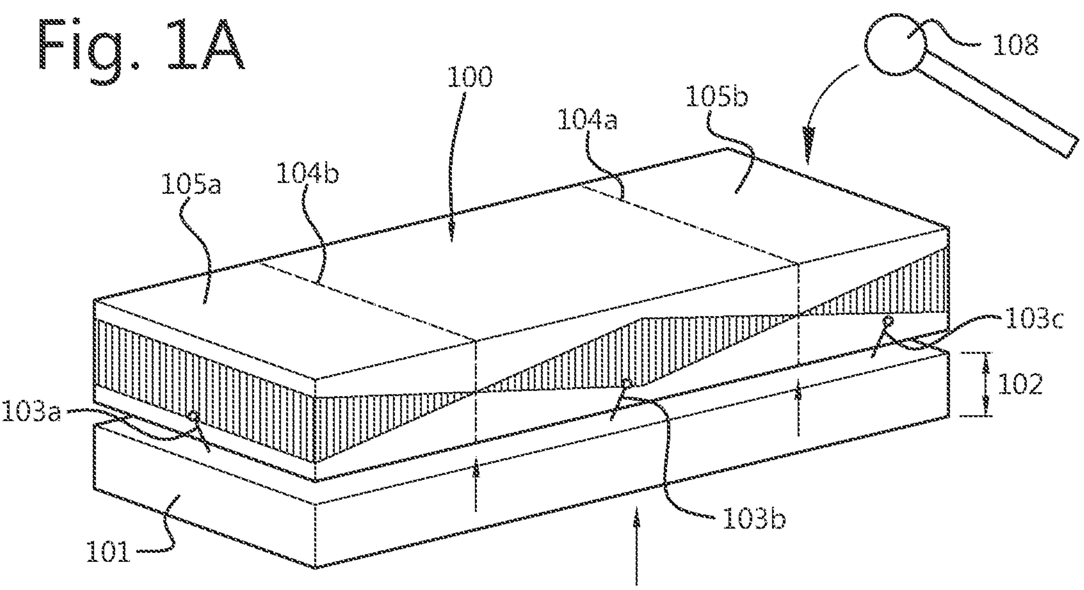

The present invention relates to an impact excitation measurement system as described above and further in this document, a kit comprising an impact excitation measurement system, a support system and at least one test piece as described above and further in this document, and a method for acoustically measuring material properties of a test piece as described here above and further in this document.

The terms "acoustic" and "vibrational" are used as synonyms throughout this text.

The measurements which can be performed using the system or method of the present invention, are preferably performed over a temperature interval comprising a lower limit and an upper limit. This temperature interval preferably comprises a lower limit of at most 50° C., more preferably at most 30° C., even more preferably at most 20° C., still more preferably at most 0° C., yet more preferably at most −18° C., yet even more preferably at most −80° C. A particularly preferred lower limit of the temperature interval is room temperature. The temperature interval preferably comprises an upper limit of at least 20° C., more preferably at least 50° C., still more preferably at least 100° C., even more preferably at least 200° C., still more preferably at least 400° C., yet even more preferably at least 600° C., still even more preferably at least 800° C., yet even more preferably at least 1000° C. or higher, such as 1100° C., 1200° C., 1300° C., 1400° C., 1500° C., 1600° C. and any value therebetween or above. The material of the bedding is preferably thermally stable over the temperature interval. In view of the large temperature interval, possibly between −80° C. and 1600° C., but particularly between 0° C. and 1600° C., the bedding is preferably made of a ceramic material or a glass-like material, such as mullite ($SiO_2$), alumina ($Al_2O_3$) or a combination thereof such as polycrystalline mullite and alumina wool, preferably in a nonwoven structure. Preferably, hereby the bedding comprises between 10 wt % and 50 wt % mullite, and between 50 wt % and 90 wt % alumina. More preferably, the bedding comprises between 20 wt % and 40 wt % mullite, and between 60 wt % and 80 wt % alumina. Still more preferably, the bedding comprises between 25 wt % and 35 wt % mullite, and between 65 wt % and 75 wt % alumina. Yet more preferably, the bedding comprises about 28 wt % mullite, and about 72 wt % alumina.

In an embodiment, the bedding comprises a flat mat shape. Preferably, the bedding comprises a height between 5 mm and 50 mm, more preferably between 6 mm and 45 mm, still more preferably between 7 mm and 40 mm, yet more preferably between 8 mm and 35 mm, still more preferably between 9 mm and 30 mm, yet more preferably between 10 mm and 29 mm, such as 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm or any value therebetween. Particularly preferred are 12.5 mm or 25 mm. The heights of the bedding given here are measured at 20° C.

In a particularly preferred embodiment, the bedding comprises a blanket manufactured from polycrystalline mullite fiber that can be exposed to temperatures up to 1600° C. (2912° F.), which contain no organic binders or other additives which cause outgassing fumes or associated problems. Preferably the bedding exhibits excellent resistance to most corrosive agents, oxidation and reduction. Preferably, the parameters and material content of such blanket is given in the table below:

| | |
|---|---|
| Density | 100 kg/m$^3$ or 130 kg/m$^3$ |
| Binder content | 0 wt % |
| Chemical composition: | |
| Al2O3 | 72 wt % |
| SiO2 | 28 wt % |
| ZrO2 | — |
| Fe2O3 | 0.02 wt % |
| TiO2 | 0.001 wt % |
| MgO | 0.05 wt % |
| CaO | 0.05 wt % |
| Na2O3 | 0.10 wt % |
| Alkali | — |
| Leachable chlorides | 11 ppm |
| Other inorganics | — |

An example of a preferred bedding comprises a Fibermax® Needled Blanket as offered by M.E. Schupp Industriekeramik GmbH.

Preferably the test piece comprises a predefined shape and/or predefined sizes. This makes it easier to perform measurements as it allows measuring on different test pieces with the same predefined shape and/or sizes, using the same support system.

Preferably the impactor is, or at least comprises, a mechanical impactor. The mechanical impactor may be actuated in a number of manners, such as for instance, mechanically or electromechanically. A mechanical impactor may be preferred since mechanical systems tend to be usable over wide temperature ranges.

Preferably the bedding of the support system is fixated with respect to the testing chamber. This fixation can be permanent, e.g. by gluing the bedding to a portion of the testing chamber, or the fixation may be releasable, e.g. by clamping, screwing, bolting or pinning the bedding to a portion of the testing chamber.

During the measurements, it may be important that the test piece does not get repositioned with respect to the bedding. This is particularly important if the test piece is positioned onto the bedding in such a way that a particular vibrational node of the test piece is to be excited. In such setups, it is preferred that the test piece is prohibited from being repositioned with respect to the bedding, while being allowed to vibrate. This can be achieved by restricting horizontal movement of the test piece. The exact way of restricting such horizontal movement may depend on the shape of the test piece, but in many cases a set of pins may be used, whereby the pins are inserted into the bedding, just aside the test piece, preferably pins being placed on all sides of the test piece, thereby restricting horizontal movement of the test piece. If the test piece has a beam like shape, preferably at least four, more preferably at least four pins are used, at least one pin being fixed to the bedding at each of the four sides of the beam-like shaped test piece. The optional fifth pin, or also optional further pins, may then be positioned at any side to prevent horizontal rotation of the test piece. This is illustrated in FIG. 1A, showing how a beam-shaped test piece (100) is supported by a bedding (101) in the shape of a flat mat of a certain height (102), e.g. 25 mm. The test piece (100) is restricted from moving horizontally by a set of pins, three of which (103*a*, 103*b*, 103*c*) are shown in the figure, but at least two of which are present behind the test piece to fully restrict the horizontal movement. A mechanical impact provided to the test piece by an impactor (108) induces vibration of the test piece according to the vibrational modes of the test piece. Depending on the position of the impact, certain vibrational modes are preferentially excited. For instance, in the figure shown, the impact is provided on the end of the test piece, at the position of an anti-node (105*b*) of a bending mode having two nodes (104*a*, 104*b*). A similar excitation can be achieved by providing the impact on another antinode (105*a*) on the other side of the test piece. Preferably, the impact is provided to the test piece at the position of an antinode of the vibrational mode of the test piece which is intended to be measured.

The amplitude of the bending mode vibration at the position of the nodes vanishes or is at least very small in the center-of-mass frame of the test piece. This means that the test piece is supported at the position of the nodes during the full test. The elasticity of the bedding ensures that the test piece is allowed to vibrate essentially freely, i.e. the vibration being essentially unaffected by the presence of the bedding. In fact, the elasticity of the bedding ensures that the bedding is capable of following the vibrational movement of the test piece.

The measurements of the vibrational response allow an experimenter to obtain the eigenfrequencies of different vibrational modes, such as bending modes and torsional modes, as well as the damping coefficients, which are indicative of how fast a vibrational mode dies out. The present invention allows obtaining these vibrational characteristics at different temperatures. A sudden or unexpected change in characteristics with temperature, such as a sudden or unexpected shift in eigenfrequency or damping coefficient, typically signals a change, a defect or an error in the structure of the test piece.

The eigenfrequency $f_r$ of a bending vibration mode is indicative of the sample's dynamic Young's modulus E. For the illustrated beam with mass m, length L, width b, and thickness t, one may use the following relation:

$$E = 0.9465\left(\frac{mf_f^2}{b}\right)\left(\frac{L^3}{t^3}\right)T$$

with the correction factor T defined as $$T = 1 + 6.585\left(\frac{t}{L}\right)^2 \text{ if } L/t \geq 20.$$

The eigenfrequency $f_t$ of a torsional vibration mode is indicative of the sample's shear modulus. For the illustrated beam with mass m, length L, width b, and thickness t, one may use the following relation:

$$G = \frac{4Lmf_t^2}{bt}R$$

with the correction factor R defined as $$T = \left[\frac{1 + \left(\frac{b}{t}\right)^2}{4 - 2.521\frac{t}{b}\left(1 - \frac{1.991}{e^{\pi\frac{b}{t}} + 1}\right)}\right]\left[1 + \frac{0.00851b^2}{L^2}\right] - 0.060\left(\frac{b}{L}\right)^{\frac{3}{2}}\left(\frac{b}{t} - 1\right)^2.$$

A bedding (101) of a system according to the invention is illustrated in FIG. 1B. It comprises a through (106), preferably at the position corresponding to an antinode of a vibrational mode of the test piece which can be placed onto the bedding. The impact can hereby be provided from below (107), e.g. using a ballistic impactor.

Figure 2:
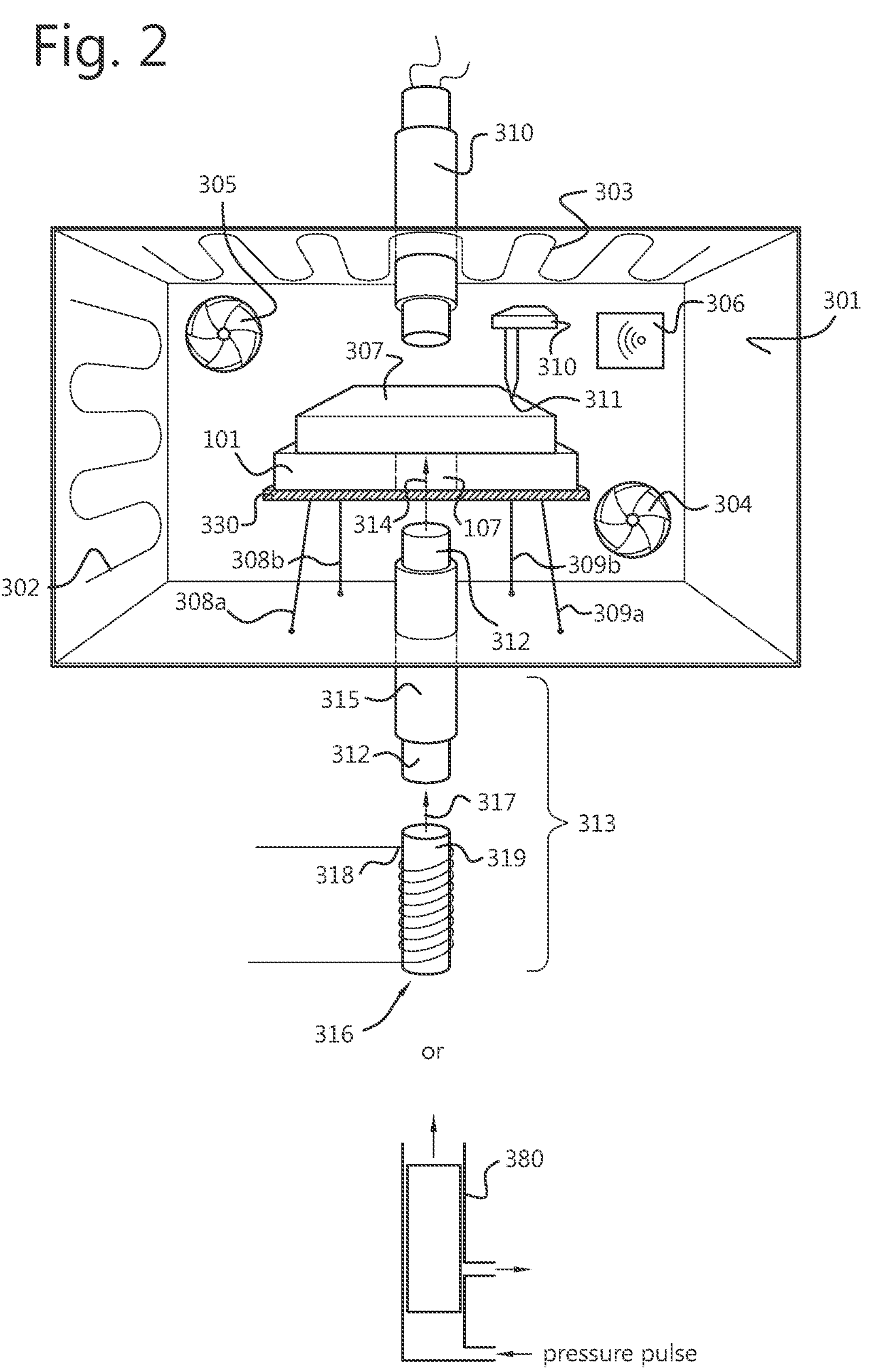
FIG. 2 illustrates an embodiment of a system according to the present invention.
Figure 3:
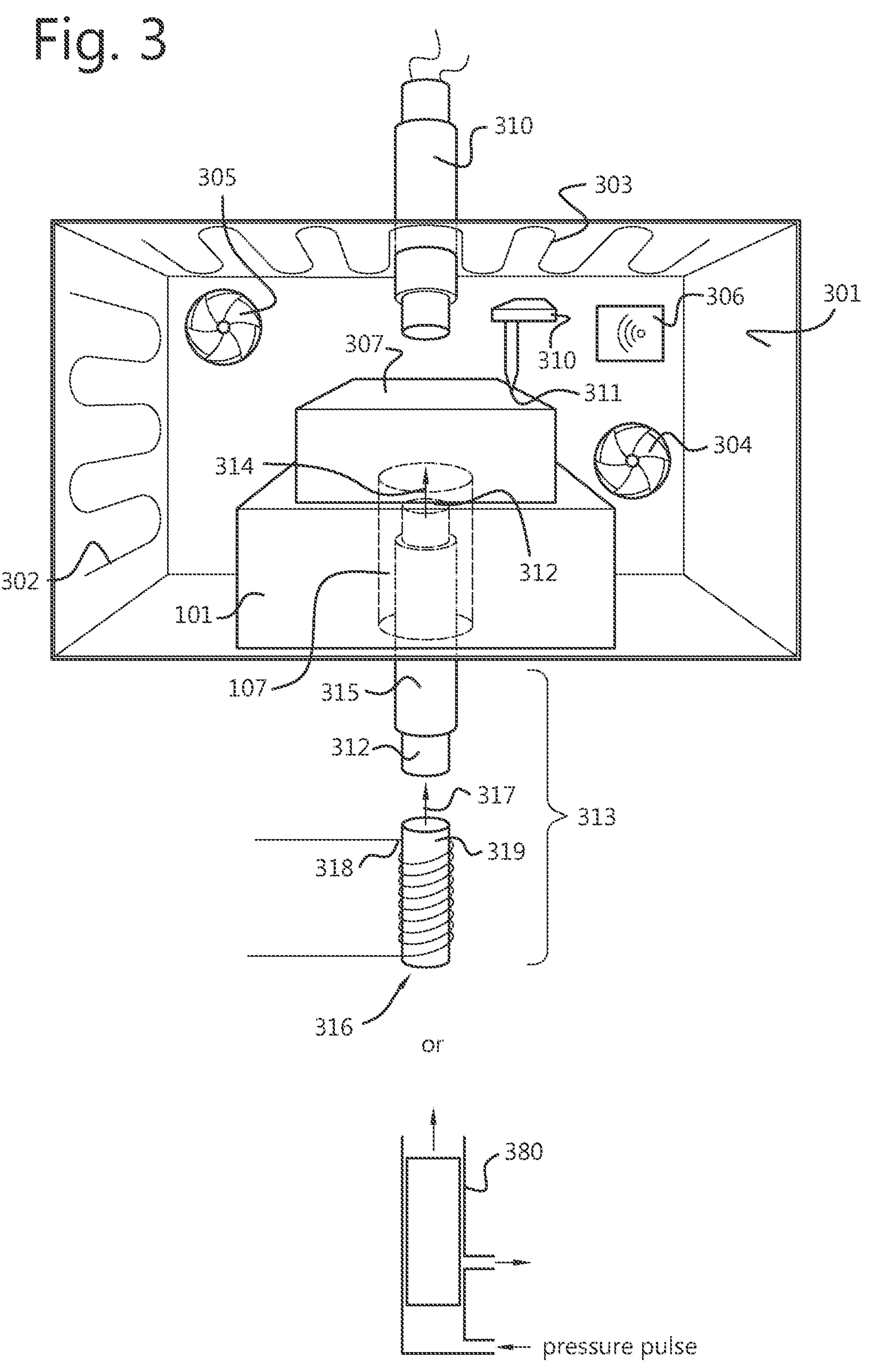
FIG. 3 illustrates an embodiment of a system according to the present invention.

FIGS. 2 and 3 illustrate systems according to the present invention. The figures show a temperature controlled testing chamber ("heating chamber", 301) comprising a set of heating elements (302, 303, 304, 305, 306) capable of bringing the heating chamber and/or the test piece to a desired temperature or desired temperature range. Heating elements (302, 303) may be attached to a heating chamber wall and provide heat thereto, e.g. by heat exchange with a high pressure fluid at high temperature, by electrical resistance heating, by magnetic induction, etc. The heat of these wall-heating elements can be distributed into the heating chamber, e.g. by ventilators (304, 305). The ventilators (304, 305) may also be arranged to provide a warm fluid such as heated air or steam, to the heating chamber. A heating element may also comprise a radiative heating element, such as a microwave element (306). The heating chamber preferably also comprises one or more thermometers for measuring the actual temperature in the heating chamber and/or of the test piece, and preferably also comprises a control circuit arranged for controlling the temperature of the test piece and/or the heating chamber.

The test piece (307) is suspended by a support comprising a bedding (101), which in FIG. 2 is placed on a table (330) comprising a set of support bars (308*a*, 308*b*, 309*a*, 309*b*) which bedding allows the test piece to vibrate as freely as possible because of the bedding's elasticity being substantially larger than the test piece's elasticity. In FIG. 3, the bedding (101) is positioned on a bottom surface of the heating chamber, thereby removing any effects of thermal expansion of any supporting structure such as the table in FIG. 2. An acoustic sensor (310), or multiple acoustic sensors, which may comprise a microphone or a laser-interferometer, can be brought into contact (311) with the test piece, preferably at a well-defined location, or a waveguide tube can be used for guiding the acoustic response to an acoustic sensor, preferably one end of the waveguide being brought nearby or in direct contact with the test piece in the heating chamber and another end preferably being located outside of the heating chamber. The latter embodiment allows to place the sensor outside of the heating chamber. The bedding (101) comprises a through (107) which allows the top end of an impactor (312) to provide an impact to the test piece.

In a preferred embodiment, the acoustic sensor comprises a laser interferometer. A laser interferometer is particularly useful for measurements in vacuum, and allows contactless measurements. Alternatively or additionally, the acoustic sensor may comprise an ultrasonic measurement sensor and/or a time-of-flight sensor and/or a Doppler-based sensor, for instance as described in:

S-R. Huang, R. M. Lerner, K. J. Parker, "Time domain Doppler estimators of the amplitude of vibrating targets". J. Acous. Soc. Am., 91 (2), 965-974 (1992);

J. Tapson, "High precision, short range ultrasonic sensing by means of resonance mode-locking", Ultrasonics, 33, 6, 441-444 (1995)), and in R. Kazys, R. Sliteris, L. Mazeika, "Ultrasonic technique for Vibration Measurements", Proceedings of the 15th World Conference on Non-Destructive Testing, 15-21 Oct. 2000 in Rome, https://www.ndt.net/article/wcndt00/papers/idn246/idn246.htm.

Also these types of sensor may be used for contactless measurements.

In an embodiment, the method of the present invention is performed whereby the heating chamber comprises a pressure which is lower than the atmospheric pressure, preferably 0.5 bar or less, more preferably 0.2 bar or less, most preferably essentially a vacuum pressure. Hereby, preferably a laser interferometer is used to allow contactless vibrational measurement at low to zero pressure. Measurements at reduced to zero pressure dampen surrounding noises, thereby increasing the signal-to-noise ratio.

The impactor preferably comprises a ballistic impactor (312) which can be provided with an impulse by an impactor actuator (313). The ballistic impactor (312) is preferably a ceramic rod which can withstand high temperatures and whose properties do not change considerably with temperature, i.e. the impactor preferably essentially consists of a thermally stable ceramic material. It can be shot upwards (314) towards the test piece using the impactor actuator (313), which comprises:

- a guiding tube (315) through the bottom of the heating chamber, for guiding the ballistic impactor along a preferably vertical direction;
- an electromechanically operated hammer (316) arranged to impart a, preferably vertical, impulse (317) to the impactor (312). The hammer (316) may comprise an electrical coil (318) and a movable rod or bullet (319) which can move depending on the electrical current flowing through the coil (318). An example of such a system is presented in U.S. Pat. No. 6,782,970 B2, whereby in the present invention the bullet of the impactor actuator imparts an impulse to the ceramic impactor (312) rather than directly to the test piece. Alternatively, a pressure-driven impactor or a pressure-driven impact actuator (380) for imparting an impulse to the impactor may be used.

Preferably the support bars of the table are made from the same material as the impactor and/or the guiding tube. Preferably hereby, the support bars essentially consist of a thermally stable ceramic material.

In an embodiment of the method of the present invention, the step b of performing a background measurement within said testing temperature range by capturing a vibrational signal from the test piece within a calibration period, thereby obtaining a noise signal, is preferably performed. Taking into account the background noise of the environment when performing the analysis of the vibrational response, leads to a better determination of the material properties. Further, by taking the background noise into account in the same testing temperature range as for the acoustic measurement, the inventors have found that a much better analysis of the vibrational response can be performed. This is because the noise can be highly dependent on the temperature range due to e.g. heating elements, ventilators or any other equipment or equipment components used to perform the measurement, each of which could behave differently in different temperature ranges. Note that this noise may comprise noise from the testing equipment itself, in particular noise from the impactor and/or impactor actuator, which may be temperature dependent.

The inventors have further found that the best results are achieved if the background measurement is performed by doing all the steps of the acoustic measurement, with the exception of imparting the vibrational excitation onto the test piece. Hence, in a preferred embodiment, step b of performing the background measurement comprises performing all the steps of step c of performing the acoustic measurement, with the exception of step c1 of imparting the vibrational excitation onto the test piece. This applies to the above described method as well as to all embodiments of the method which are described later in this document and in the claims. Performing the calibration measurement at each temperature or temperature interval at which an acoustic response to the impact is measured, allows to take into account the temperature dependence of the testing equipment, and in particular of the impactor and/or impactor actuator.

In a preferred embodiment, the testing chamber of the impact excitation measurement system of the present invention comprises a heating element for bringing the test piece within a testing temperature range.

In a preferred embodiment, the impact excitation measurement system comprises an impactor actuator, for actuating the impactor when imparting a vibrational excitation onto a test piece located in the testing chamber.

In a preferred embodiment, the impact excitation measurement system comprises a control system in connection with the testing chamber, the sensor and the impactor, the control system configured to:

- optionally instruct the testing chamber to bring the test piece within a testing temperature range;
- during a testing period, instruct the impact system to actuate the impactor with the impactor actuator such that a vibrational excitation is mechanically imparted by the impactor onto a test piece located in the heating chamber, and obtain from the sensor a vibrational response signal to said vibrational excitation,
- optionally during a calibration period, instruct the impact system to actuate the impactor with the impactor actuator such that the impactor does not mechanically impart a vibrational excitation onto the test piece located in the heating chamber, and obtain from the sensor a noise signal, and
- obtain the material properties of the test piece by analysing the vibrational response signal, preferably thereby taking into account the noise signal.

In a further aspect, the present invention concerns a thermal expansion measurement method for obtaining a thermal expansion parameter of a test piece. This thermal expansion measurement method comprises the steps of:

extracting at least two resonance frequencies from experimental data at a first temperature, obtaining a first value of a first dimension parameter from said at least two resonance frequencies at said first temperature, comparing said first value of said first dimension parameter at said first measurement temperature with a second value of said first dimension parameter at a second temperature, computing the thermal expansion parameter from said comparison.

Hereby the at least two resonance frequencies at the first temperature are material properties of the test piece, which can preferably be obtained via the acoustic measurement method described above and further in this document. The impact excitation measurement system as described above and further in this document, may preferably be used to obtain the at least two resonance frequencies.

Figure 4:
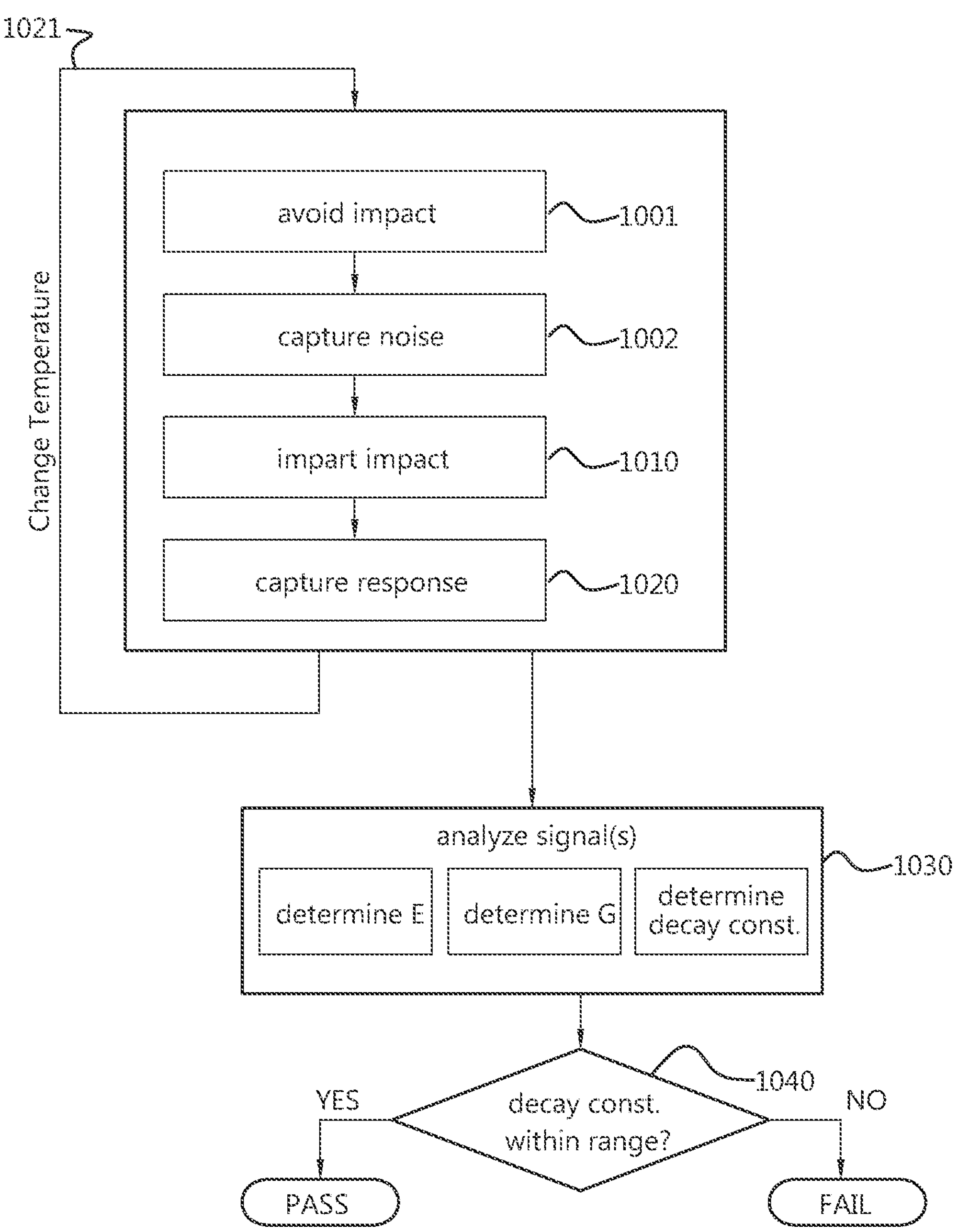
FIG. 4 illustrates a method for measuring an acoustic response and for obtaining material properties from these measurements at different temperatures according to the present invention.

FIG. 4 illustrates an embodiment of the method according to the present invention. In a first step a, the temperature is brought within a first temperature range (1021). Step b is then performed (1002) whereby care is taken that no impact is provided onto the test piece (1001), whereby preferably an impact system is actuated, but in such a way that impact is avoided. Step c is then performed whereby an impact is imparted onto the test piece (step c1, 1010) and the vibrational response signal is captured (step c2, 1020). The signals are then analysed (step d, 1030) whereby E, G, v and/or other properties (in particular also the decay constants) are obtained within the temperature range of step a. The impact-avoiding actuation step (1001), noise capturing step (1002), impact step (1010) and response capturing step (1020) may be performed repeatedly, before the signals are analyzed (1030) (as illustrated, for example when the apparatus has multiple impactors operated consecutively), or alternatively, each captured signal may be analyzed separately. Hereby, the noise signals and/or vibrational response signals at different temperatures or temperature ranges may be combined in the analysis of step d to obtain more accurate values for the material properties and/or to determine the temperature-dependence of these material properties.

Depending on the chosen excitation mode, the analyzing 1030 may further comprise determining a dynamic Young's modulus (E) or a shear modulus (G) from the frequencies in the spectrum of the response, in particular by identifying the peak frequency and applying a formula such as the ones provided above.

Preferably, the analyzing further comprises comparing 1040 the decay constants to reference values. This step allows the method according to the present invention to be used for quality control purposes. Indeed, a method of controlling a quality of an article of manufacture, comprises characterizing at least a part of the article of manufacture as said solid material sample using the method described above, signaling a "pass" condition 1040/YES if the decay constants are within a predetermined margin of said reference values; and declaring a "fail" condition 1040/NO if the decay constants are outside said predetermined margin of said reference values. Hence, according to an aspect of the present invention, there is provided a method of controlling a quality of an article of manufacture, the method comprising: characterizing at least a part of said article of manufacture as said test piece using the method as described above; signaling a "pass" condition if said decay constants are within a predetermined margin of said reference values; and declaring a "fail" condition if said decay constants are outside said predetermined margin of said reference values.

In an embodiment of the invention, the steps a to d are performed more than once, and preferably repetitively, at the same temperature, at different temperatures or within different temperature ranges. In a preferred embodiment, the test piece is heated up continuously, whereby the steps a-d are performed within subsequent temperature ranges.

For example, a test piece can be heated up continuously at a rate of 1° C./s, starting from room temperature (20° C.). The steps a-d can then be performed regularly every 20 s, which means that the first set of steps a-d are performed in the temperature range of 20 to 40° C., the second set of steps a-d are performed in the temperature range of 40 to 60° C., and further on up to e.g. a maximum temperature range of 1580 to 1600° C. Note, however, that the temperature ranges do not need to be equally large, but may for instance be smaller for temperature ranges of interest. E.g. if one knows that the test piece or a component made from the same material as the test piece will be mainly used at temperatures between 70° and 800° C., one could decide to measure the material properties more accurately between these temperatures by taking smaller temperature ranges, e.g. spanning 5° C.

Further also note that the measurements performed in steps b and/or c, could be combined with measurements performed in steps b and/or c at other temperatures in order to obtain a more accurate noise signal and/or vibrational response signal. For instance, suppose one performs steps a-d in the temperature range 80° C. to 100° C. and also in the temperature range 100° C. to 120° C. Hereby one could have executed step b the first time in a temperature subrange of 82-87° C. and the second time in a temperature subrange of 102-107° C., while step c could have been executed a first time in a subrange of 92-97° C. In such case, the analysis in step d could be performed taking into account the two noise signals obtained in the two times step b was performed. Hence, in a preferred embodiment, steps a, b, c and/or d are performed two times or more within a temperature range. Alternatively or additionally, steps a, b, c and/or d may be performed multiple times at different temperature ranges which may overlap.

In an embodiment, the control system comprises processing means configured to analyze the vibrational response signal by taking into account the noise signal to determine the material properties of the test piece.

Hereby the processing means may preferably be configured to subtract the noise signal from the vibrational response signal in the time domain or, more preferably, in the frequency domain by using a Fourier transform or a fast Fourier transform or a Harmonic decomposition to the captured signals. The subtraction may also be performed in a combination of the time domain and the frequency domain. The processing means is preferably configured to analyze the time-varying signal to determine the frequencies and decay constants of sinusoids making up the time-varying signal, i.e. it solves a harmonic inversion problem. The problem of a harmonic inversion, which more generally consists of determining frequencies, decay constants, amplitudes, and phases of the sinusoids making up a discrete-time, finite-length signal that consists of a sum of a finite number of such sinusoids in a given bandwidth, is well known in literature, but has not been associated with IET to date. Vladimir A. Mandelshtam and Howard S. Taylor have described the use of the general filter-diagonalization method of Wall and Neuhauser to solve this problem by recasting the harmonic inversion problem as the one of a small matrix diagonalization in their seminal paper "Harmonic inversion of time signals and its applications", The Journal of Chemical Physics 107, 6756 (1997). Computer-based implementations of this technique are known in the art, including the "Harminv" program by Steven G. Johnson of the Massachusetts Institute of Technology. The result of the analysis may be output to the screen 140 or to any other suitable interface for storage or further processing by other equipment.

The processing means may consist of one or more dedicated hardware components (e.g. ASIC), appropriately configured configurable hardware components (e.g. FPGA), microprocessors provided with suitable software, or a combination of the above. The same components may also perform other functions.

In a preferred embodiment of the present invention, the test piece is a workpiece, an apparatus or a component of an apparatus. In another preferred embodiment of the invention, the test piece comprises a well-defined shape, preferably a beam shape, and is made from the same material of, or using the same production technique of, a workpiece, an apparatus or a component of an apparatus.

The invention claimed is:

1. An impact excitation measurement system comprising a temperature-controlled testing chamber, an impactor, a sensor system and a support system, wherein the impactor is configured to, at any testing temperature within a testing temperature range of between 0° C. and 1600° C., provide an impact from below to a test piece supported by the support system, wherein the sensor system is configured to obtain a vibrational response of the test piece to the impact provided to the test piece by the impactor, wherein the support system comprises a bedding for supporting a solid test piece within the testing chamber, said bedding comprising an elasticity which is substantially larger than the elasticity of the test piece, said bedding further comprising a through for allowing the impactor to provide an impact to the test piece from below, wherein the impactor is configured to provide the impact to the test piece at an impact height which impact height is at least partially dependent upon the testing temperature, wherein the bedding is configured to support the test piece at a support height which differs from the impact height for at most 0.5 mm at any testing temperature within said testing temperature range.

2. The system according to claim 1, wherein the support height differs from the impact height for at most 0.1 mm at any testing temperature within the testing temperature range between 0° C. and 1600° C.

3. The system according to claim 1, wherein the impactor comprises a thermally stable material, comprising a linear expansion coefficient which is at most 25×10-6 K−1.

4. The system according to claim 1, wherein the impactor comprises a ceramic material, wherein the impactor is made of a ceramic material.

5. The system according to claim 1, wherein the bedding comprises a thermally stable material, comprising a linear expansion coefficient of at most 50×10−6 K−1.

6. The system according to claim 1, wherein the bedding comprises a flat mat shape.

7. The system according to claim 1, wherein the bedding comprises polycrystalline mullite-alumina wool.

8. The system according to claim 7, wherein the bedding is made of polycrystalline mullite-alumina wool.

9. The system according to claim 1, wherein the bedding comprises a height of between 10 mm and 50 mm.

10. The system according to claim 1, wherein horizontal movement of the test piece is restricted by a set of pins.

11. A method for acoustically measuring material properties of a test piece, at one or more temperatures within a temperature range of between 0° C. and 1600° C., comprising the steps of:

a) placing a test piece on the support system in a testing chamber of a system according to claim 1, and heating the test piece to within a testing temperature range;

b) performing a background measurement, within said testing temperature range, by capturing a vibrational signal from the test piece within a calibration period, thereby obtaining a noise signal;

c) performing an acoustic measurement on said test piece, within said testing temperature range, within a testing period by:

c1) imparting a vibrational excitation onto the test piece;

c2) capturing a vibrational signal of the test piece within the testing period, thereby obtaining a vibrational response signal to said vibrational excitation, and d) obtaining the material properties of the test piece by analyzing the vibrational response signal, thereby taking into account the noise signal.

12. A kit comprising:

an impact excitation measurement system comprising a temperature-controlled testing chamber, an impactor and a sensor system, wherein the impactor is configured to, at any testing temperature within a testing temperature range of between 0° C. and 1600° C., provide an impact from below to a test piece, wherein the sensor system is configured to obtain a vibrational response of the test piece to the impact provided to the test piece by the impactor, wherein the impactor is configured to provide an impact to a test piece at an impact height which impact height is at least partially dependent upon the testing temperature, a solid test piece, and a support system, comprising a bedding for supporting a solid test piece within the testing chamber, said bedding comprising an elasticity which is substantially larger than the elasticity of the test piece, said bedding further comprising a through for allowing the impactor to provide an impact to the test piece from below, the bedding comprising a support surface for supporting the test piece at a support height which differs from the impact height for at most 0.5 mm at any testing temperature within said testing temperature range.

13. The kit according to claim 12, comprising a set of pins for restricting horizontal movement of the test piece with respect to the bedding.

* * * * *